United States Patent Office 3,408,359
Patented Oct. 29, 1968

3,408,359
7-METHYL-8-HYDROXY-1,4-DIHYDRO-o-
DIOXIN(4,5-c)PYRIDINE
Peter I. Pollak, Scotch Plains, N.J., assignor to Merck & Co., Inc., Rahway, N.J., a corporation of New Jersey
No Drawing. Original application Oct. 21, 1965, Ser. No. 500,345, now Patent No. 3,365,461, dated Jan. 23, 1968. Divided and this application Aug. 3, 1967, Ser. No. 671,173
1 Claim. (Cl. 260—297)

ABSTRACT OF THE DISCLOSURE

7 - methyl - 8 - hydroxy-1,4-dihydro-o-dioxin-(4,5,c)-pyridine, an intermediate useful in preparing pyridoxine, prepared by reacting 4-methyl-5-cyanooxazole with a cyclic peroxide derivative of 2-butene-1,4-diol, namely, 3,6-dihydro-1,2-dioxin.

---

This application is a divisional of my parent application Serial No. 500,345, filed October 21, 1965, now U.S. Patent No. 3,365,461.

This invention relates to a new process for the preparation of vitamin $B_6$. More particularly, it is concerned with a process for the preparation of a new 2-methyl-3-hydroxy pyridine, namely, 7 - methyl-8-hydroxy-1,4-dihydro-o-dioxin(4,5,c)pyridine by the reaction of a derivative of a 2-butene-1,4-diol with a 4-methyl-5-substituted oxazole. It is also concerned with the conversion of this new pyridine derivative to vitamin $B_6$. Further, this invention is concerned with a new cyclic peroxide derivative of 2-butene-1,4-diol which is used as a starting material for the preparation of 7-methyl-8-hydroxy-1,4-dihydro-o-dioxin(4,5,c)pyridine.

The preparation of pyridoxine by the reaction of oxazoles with derivatives of 2-butene-1,4-diol to produce pyridine intermediates and the subsequent conversion of these intermediates to pyridoxine by several methods has been described in the art. Many of these processes involve a multiplicity of steps and require many reactants. Also, many of the intermediates are difficult to convert to vitamin $B_6$. Thus other processes more suitable for the preparation of vitamin $B_6$ have been sought.

It is an object of this invention to provide an improved process for the preparation of Vitamin $B_6$. It is a further object to provide a new 2 - methyl-3-hydroxy-pyridine, called 7 - methyl - 8-hydroxy-1,4-dihydro-o-dioxin(4,5,c)-pyridine, which can be converted to vitamin $B_6$ by hydrogenolysis and processes for preparing this compound. Another object is to provide a new cyclic peroxide derivative of 2-butene-1,4-diol which is a useful starting material for the preparation of 7 - methyl-8-hydroxy-1,4-dihydro-o-dioxin(4,5,c)pyridine and methods of preparing this compound. Other objects will be apparent from the detailed description of this invention hereinafter provided.

In accordance with the present invention it is now found that pyridoxine can be readily and conveniently produced by reacting a 4-methyl-5-cyano oxazole or a 4-methyl-5-hydrocarbonoxy oxazole with a new cyclic peroxide derivative of 2-butene-1,4-diol, namely, 3,6-dihydro-1,2 - dioxin to produce 7-methyl-8-hydroxy-1,4-dihydro-o-dioxin(4,5,c)pyridine and then hydrogenolyzing the 7-methyl - 8-hydroxy-1,4-dihydro-o-dioxin(4,5,c)pyridine so produced to yield pyridoxine. The over-all reaction can be illustrated structurally as follows:

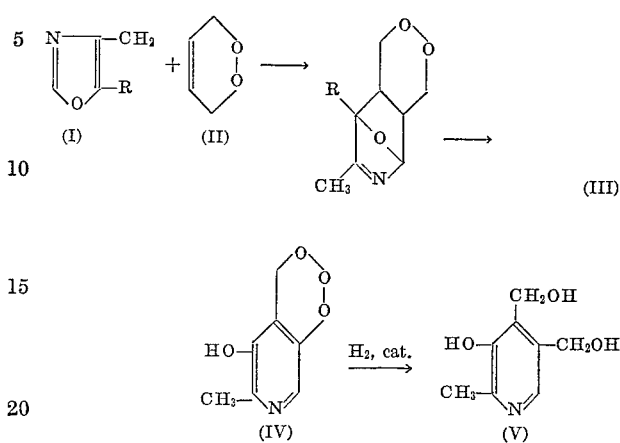

wherein R represents a cyano or a hydrocarbonoxy group.

Thus, in accordance with the foregoing flow sheet the oxazole (I) is reacted with 3,6-dihydro-1,2-dioxin (II) to produce 7-methyl-8-hydroxy-1,4-dihydro-o-dioxin(4,5,c)-pyridine (IV) and this compound then hydrogenolyzed to produce pyridoxine (V). In the foregoing described reaction, the substituent R of the oxazole moiety shown in Formula I above represents a cyano or a hydrocarbonoxy group. The process of this invention can be carried out with a 4-methyl-5-cyano oxazole or with various 4-methyl-5-hydrocarbonoxy oxazoles although with regard to the latter compounds, it is generally preferred to use the oxazole having a hydrocarbon group containing from 1 to 10 carbon atoms, since such compounds are more readily prepared and under optimum conditions produce high yields of the desired substituted pyridine intermediate shown by Formula IV above. Thus, oxazoles wherein the hydrocarbon substituent is a lower alkyl group of from 1 to 10 carbon atoms such as methyl, ethyl, isopropyl, butyl, isobutyl, amyl and octyl, a heterocyclic alkyl such as tetrahydrofurfuryl; an aralkyl group such as benzyl, phenyl ethyl and phenyl propyl or an aryl group such as phenyl, tolyl and the like, represent the preferred oxazoles which can be used in the process of the present invention.

The cyclic peroxide derivative of 2-butene-1,4-diol hereafter called 3,6-dihydro-1,2-dioxin, which is reacted with the oxazole to produce 7-methyl-8-hydroxy-1,4-dihydro-o-dioxin(4,5,c)pyridine is prepared by reacting a halogenated derivative of 2-butene-1,4-diol such as, for example, 1,4-dibromo-2-butene with hydrogen peroxide. It is preferred to use hydrogen peroxide as an aqueous solution such as a 30% aqueous hydrogen peroxide solution in this reaction. The preparation of the 3,6-dihydro-1,2-dioxin starting material is preferably carried out in the presence of an aqueous alkali metal hydroxide solution such as, for example, aqueous potassium hydroxide solution. The 3,6-dihydro-1,2-dioxin produced is isolated from the reaction mixture by methods known in the art, one such method being for example, extraction of the product with an organic solvent and vacuum-fractionation of the concentrated solvent solution to yield the desired starting material in essentially pure form.

The reaction between the oxazole and the 3,6-dihydro-1,2-dioxin is effected by intimately contacting a mixture of the reactants for a sufficient time to produce 7-methyl-8-hydroxy-1,4-dihydro-o-dioxin(4,5,c)pyridine. The reaction of the oxazole and the 3,6-dihydro-1,2-dioxin can be carried out at temperatures from about 50° C. to about 150° C., although it is preferable to carry out the reaction at a temperature of approximately 70° C. to 100° C. The formation of the 7 - methyl-8-hydroxy-1,4-dihydro-o-dioxin(4,5,c)pyridine can be accomplished in the presence of a suitable inert organic solvent such as benzene, toluene and the like, although the presence of such a solvent is not essential in carrying out the process of this invention.

In preparing the 7-methyl-8-hydroxy-1,4-dihydro-o-dioxin(4,5,c)pyridine in accordance with the present invention, the initial product formed by the reaction of the oxazole and 3,6-dihydro-1,2-dioxin is apparently an adduct which can be represented by the formula:

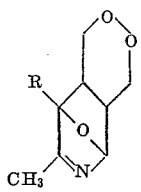

wherein R is as previously defined. This adduct which is also shown as Formula III in the flow sheet appears to be formed as a reaction product and is cleaved to form the desired 7-methyl-8-hydroxy-1,4-dihydro-o-dioxin(4,5,c)-pyridine when the reaction product is treated with an acid. This cleavage also occurs to some extend in the condensation medium itself, especially at temperatures of about 100° C. or higher. It should, of course, be understood that this explanation of the course of the reaction involving the intermediate adduct is based on our present knowledge of the reaction and does not exclude the possibility that subsequent experimental data will establish that the proposed structure of the adduct is, in fact, incorrect. Accordingly, I do not wish to be bound by these theoretical considerations and this explanation is presented only as a means of providing a better understanding of my invention.

The 7 - methyl - 8 - hydroxy - 1,4 - dihydro - o - dioxin(4,5,c)-pyridine formed can be isolated by procedures known in the art such as, for example, extraction with a suitable organic solvent and concentration of the solvent to yield the desired pyridine intermediate, although it is preferred not to isolate the 7-methyl-8-hydroxy-1,4-dihydro-o-dioxin(4,5,c)-pyridine but to immediately cleave the dioxin moiety of the latter compound to produce pyridoxine. Thus, the cleavage of the 7-methyl-8-hydroxy-1,4-dihydro-o-dioxin(4,5,c)-pyridine can be accomplished by a hydrogenolysis such as by dissolving the pyridine intermediate in a suitable solvent such as water, or an alkanol such as methanol or ethanol and this solution then subjected to a catalytic hydrogenolysis. The hydrogenolysis can be carried out at moderate hydrogen pressures; however, it is preferable to employ hydrogen gas pressures of between about atmospheric pressure and 100 p.s.i.g. gas pressure. Similarly, the hydrogenolysis can be carried out at temperatures between about 0° C. and 50° C., although room temperature is the preferable temperature at which to carry out the reaction. The hydrogenolysis is usually carried out in the presence of a hydrogenation catalyst such as, for example, Raney nickel or a noble metal catalyst such as palladium-on-carbon. The hydrogenolysis is complete when the uptake of hydrogen gas ceases and upon completion of the reaction, the pyridoxine produced can be isolated by filtering off the catalyst and concentrating the reaction solution under reduced pressure.

Alternatively, the hydrogenolysis of the 7-methyl-8-hydroxy-1,4-dihydro-o-dioxin(4,5,c)pyridine can be effected by treating the pyridine intermediate with a suitable reducing agent such as lithium aluminum hydride, sodium borohydride and the like. Thus, the reaction product of the oxazole and the 3,6-dihydro-1,2-dioxin can be dissolved in an appropriate solvent such as tetrahydrofuran and then subjected to the hydrogenolysis by the addition of a suitable reducing agent to this solution. The reaction is carried out for a sufficient time to complete the hydrogenolysis and once completed the pyridoxine produced can be isolated according to standard methods.

In a preferred embodiment of the invention, the 7-methyl - 8 - hydroxy - 1,4 - dihydro - o - dioxin(4,5,c)-pyridine can be dissolved in methanolic hydrogen chloride and this solution then subjected to a hydrogenolysis as described above to produce pyridoxine hydrochloride directly.

Following are examples which illustrate this invention. They are intended to be illustrations of the invention and not limitations thereof.

EXAMPLE 1

Preparation of 3,6-dihydro-1,2-dioxin

A mixture of 26.8 g. (1.25 mole) 1,4-dibromo-2-butene, 40 g. of 20% aqueous potassium hydroxide and 60 g. of 30% aqueous hydrogen peroxide in 450 ml. of methanol is stirred for 40 hours at approximately 25° C. The mixture is then diluted with 1200 ml. of water, saturated with solid ammonium sulfate, and extracted with 3–100 ml. portions of methylene chloride solution. The methylene chloride extracts are dried over magnesium sulfate and concentrated under reduced pressure. The concentrated methylene chloride solution is finally vacuum-fractionated at 50 mm. pressure to yield 3,6-dihydro-1,2-dioxin.

EXAMPLE 2

Preparation of 7-methyl-8-hydroxy-1,4-dihydro-o-dioxin(4,5,c)pyridine and then pyridoxine A mixture of 2.15 g. (0.025 mole) of 3,6-dihydro-1,2-dioxin prepared as described in Example 1 and 0.64 g. (0.005 mole) of 4-methyl-5-ethoxy oxazole is sealed in a tube and heated in an oil bath at 80° C. for 160 hours. The tube is cooled and opened and the resulting mixture is diluted with 50 ml. of 1 N methanolic hydrogen chloride. The solution is stirred for one hour at 80–90° C. and then 0.5 g. of granulated carbon is added and stirring is continued for an additional half-hour. The mixture containing 7 - methyl - 8 - hydroxy - 1,4 - dihydro - o - dioxin-(4,5,c)pyridine is then filtered, 0.5 g. of 10% palladium-on-carbon catalyst is added to the filtrate and the mixture is hydrogenated at 40 lb. hydrogen pressure until the hydrogen uptake ceases. The contents of the hydrogenation bomb are removed, the catalyst is filtered off, and the filtrate concentrated to dryness under reduced pressure. The residue is twice recrystallized from water to yield Vitamin $B_6$ hydrochloride (pyridoxine hydrochloride). This sample of pyridoxine hydrochloride is identical in melting point, mixed melting point, and U.V. and I.R. spectra with an authentic sample of pyridoxine hydrochloride.

The process of this example can be similarly carried out using other oxazoles in place of 4-methyl-5-ethoxyoxazole such as other 4-methyl-5-lower alkoxy oxazoles, for example, the 5-amyloxyoxazole or the 5-isopropoxyoxazole or other oxazoles such as 4-methyl-5-benzyloxyoxazole, 4-methyl-5-phenoxyoxazole, 4-methyl-5-tolyloxyoxazole, 4 - methyl - 5 - tetrahydrofurfuryloxyoxazole, or 4-methyl-5-phenylethyloxyoxazole to produce 7-methyl-8-hydroxy-1,4-dihydro-o-dioxin(4,5,c)pyridine and then vitamin $B_6$ hydrochloride.

EXAMPLE 3

Preparation of 7-methyl-8-hydroxy-1,4-dihydro-o-dioxin(4,5,c)pyridine and then pyridoxine A mixture of 2.15 g. (0.025 mole) of 3,6-dihydro-1,2-dioxin and 0.64 g. (0.005 mole) of 4-methyl-5-ethoxy oxazole is sealed in a tube and heated in an oil bath at 80° C. for 160 hours. The tube is cooled, opened, and resulting mixture diluted with 100 ml. of tetrahydrofuran. A trace of anhydrous hydrogen chloride gas is added and the reaction mixture is allowed to stand overnight at room temperature in a flask protected from moisture with a calcium chloride tube after which time the 7-methyl-8-hydroxy-1,4-dihydro-o-dioxin(4,5,c)pyridine is formed. 1.14 grams (0.03 mole) of lithium aluminum hydride is then cautiously added in small portions to the reaction mixture under vigorous stirring. The mixture is refluxed for 4 hours and cooled. Methanol is added dropwise until the hydrogen gas evolution ceases. The mixture is then diluted with 100 ml. of water and acidified with concentrated hydrochloric acid. The presence of vitamin $B_6$ hydrochloride in this solution is shown by paper strip chromatography of an aliquot developed overnight in a system of n-butanol and pH 7 borate buffer. After drying the paper, an ultraviolet absorption spot is observed with exactly the same $R_f$ as an authentic sample of vitamin $B_6$ hydrochloride previously spotted separately on the same sheet of paper.

EXAMPLE 4

Following the procedure of Example 2 and 3 but using an equivalent amount of 4-methyl-5-cyano oxazole in place of 4-methyl-5-ethoxy oxazole and carrying the reaction out over a period of 3 weeks instead of 160 hours, there is produced after acid treatment 7-methyl-8-hydroxy-1,4-dihydro-o-dioxin(4,5,c)pyridine and finally, by suitable reduction, pyridoxine hydrochloride.

What is claimed is:

1. 7 - methyl - 8 - hydroxy - 1,4 - dihydro - o - dioxin-(4,5,c)pyridine.

References Cited

UNITED STATES PATENTS 3,250,778   5/1966   Kimel et al. _____ 260—297

HENRY R. JILES, *Primary Examiner.*

A. L. ROTMAN, *Assistant Examiner.*